A. B. Sprout,
Horse Rake.

No. 1978 Reissued May 30. 1865

Witnesses:
B. D. Smith
Edward H. Knight

A. B. Sprout
By Munn & Co
Attorneys

UNITED STATES PATENT OFFICE.

ARIEL B. SPROUT, OF HUGHESVILLE, PENNSYLVANIA.

IMPROVEMENT IN HORSE-RAKES.

Specification forming part of Letters Patent No. 37,012, dated November 25, 1862; Reissue No. 1,978, dated May 30, 1865.

*To all whom it may concern:*

Be it known that I, ARIEL B. SPROUT, of Hughesville, in the county of Lycoming and State of Pennsylvania, have made a new and useful Improvement in Horse-Rakes; and I do hereby declare the following to be a clear and exact description of the same, reference being had to the accompanying drawings, which make part of this specification, and in which—

Figure 1:
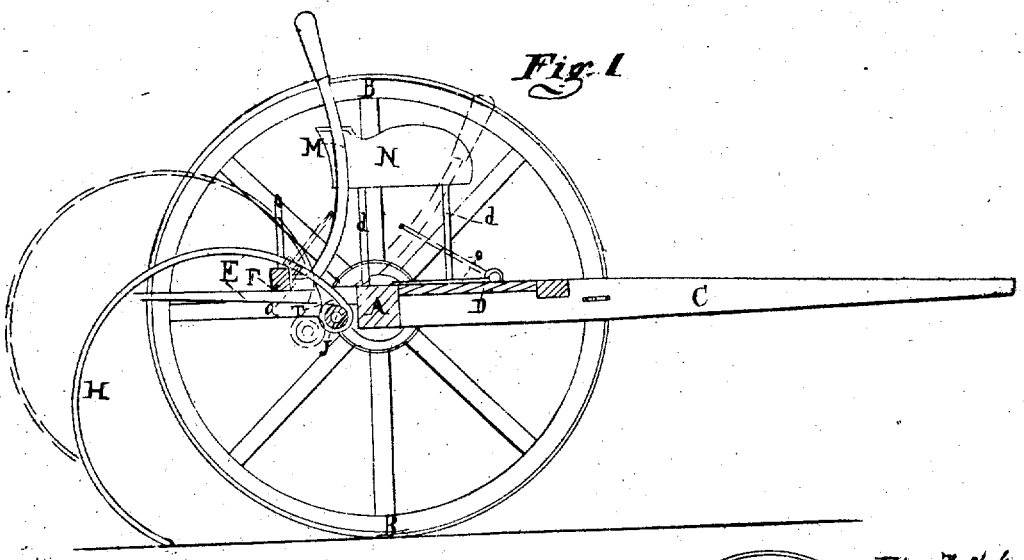
Figure 3:
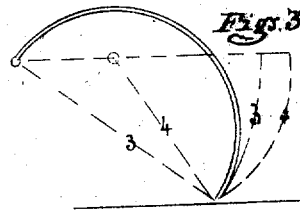
Figure 2:
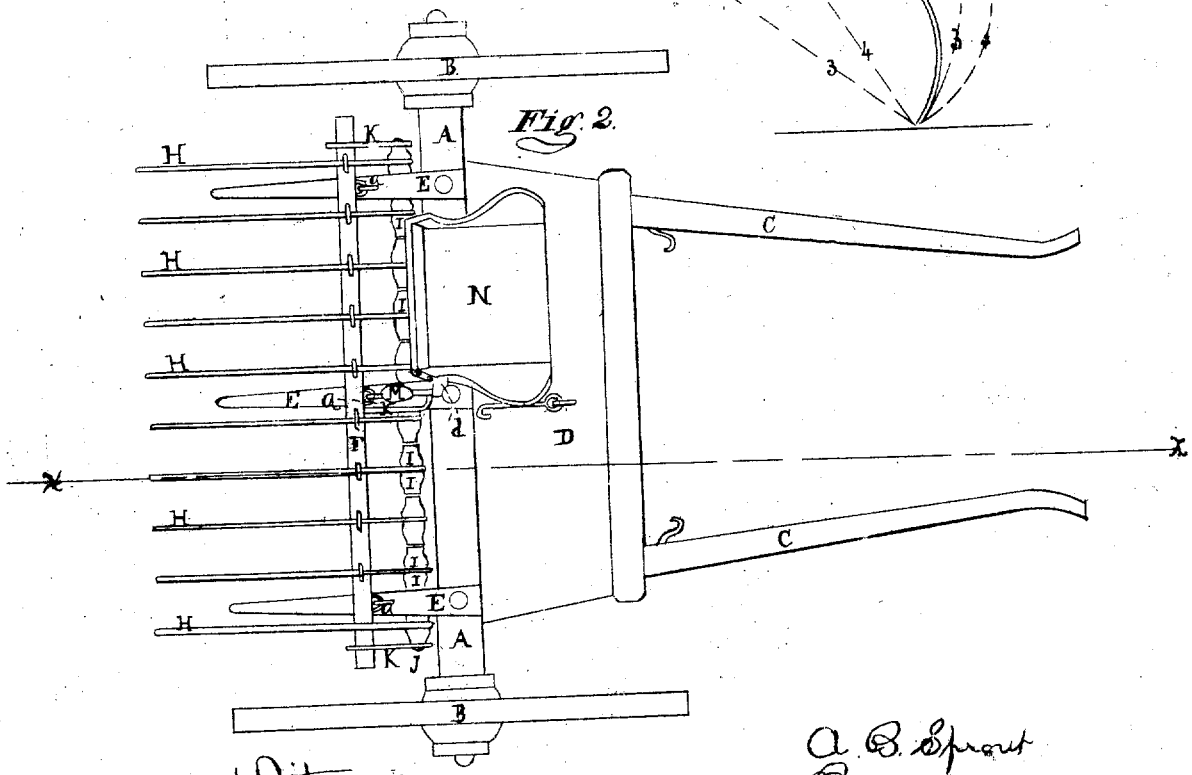

Figure 1 is a longitudinal vertical section on the line *x x*, Fig. 2. Fig. 2 is a plan or top view. Fig. 3 is a descriptive diagram to be explained.

Similar letters of reference indicate corresponding parts in both figures.

The object of this improvement is to hang the curved teeth in such a way that they shall be more readily operated by the lever and retracted in such a direction as will readily disengage them from the hay.

To enable others skilled in the art to which my invention appertains to fully understand and use the same, I will proceed to describe its construction and operation.

A represents an axle, having a wheel, B, placed loosely on each end of it, and C C are thills attached to the axle A, and having a platform, D, secured to their upper surfaces, adjoining the axle A.

E represents bars which project outwardly at right angles from the back of the axle A, and have a bar, F, attached to them by hinges or joints *a*. The bar F is parallel with the axle A, and the former has guides attached to it through which curved rake-teeth H pass. These teeth H are constructed of wire, and their upper or inner ends are attached to hubs or collars I, which are placed loosely on a shaft, J, which forms the rake-head, the ends of the latter being connected to arms K K, attached to the bar F, one near each end and one at the center of the latter.

M is a lever which is attached to the central arm, K, of the bar F, and extends upward at one side of the driver's seat N, which is supported by uprights *d*, attached to the platform D and axle A.

The operation is as follows: As the device is drawn along the teeth H will rake up the hay before them, and when the rake is fully loaded the driver, from his seat N, throws forward the lever M, and thereby turns the bar F and raises the teeth H in a curved path backward and upward, so that they will be readily disengaged from the hay. The teeth H, it will be seen, are all simultaneously raised as the lever M is thrust forward. The rake is retained in elevation when it is designed to be inoperative—as, for instance, in moving the machine from place to place—by securing the lever M down near the platform D by means of a hook, O, as shown in red in Fig. 1, and the bar F is prevented from turning on its joints or hinges, when the rake is in a working position, by means of a catch, *d'*, attached to one side of the driver's seat N. Each tooth has an independent motion, due to its elasticity, on meeting with an obstruction, which partially straightens and raises it, so as to allow it to pass over, the guides above the teeth limiting their lateral deflection as they are raised. By this construction the rake-tooth may be made of a more effective shape than is possible when it is vibrated from the forward end, or what may be called the "rake-head." The object is to give it such a shape that as the hay is drawn along the strain shall be placed upon the tooth itself, and not tend to part its connection with the place to which it is secured, but that upon this point it shall be a fair tension. It is also desirable that the ends of the teeth shall bear such a relation to the ground that they may skin the surface without catching and jumping. These objects—that is to say, the proper tension and the required position—are secured by making the teeth of the requisite length and shape; but there is another motion required of the teeth—namely, that of retracting them from the hay, so as to discharge the load. This, to be done easily and effectually, requires that the rake should be under good control, and, secondly, that the teeth shall leave the hay in such a direction as not to catch it and raise it vertically. Now, if the long teeth are vibrated upon their forward ends, or the point by which they are attached to the head, the direction in which they move is unfavorable to their withdrawal from the hay, as it is too vertical, and not sufficiently endwise relatively to the teeth. This I avoid by pivoting the teeth as I have described, by which their line of retraction is made as favorable as circumstances will allow and at the same time the rake is the more easily manipulated, as its weight is balanced, or nearly so. In endeavoring to make the line of retraction as favorable as possible the length or shape of teeth has heretofore been made shorter or straighter, so as to facilitate that portion of the requirements of a rake; but then the rake-teeth are strained upwardly by the resistance of the hay in such a manner as to tend to part the connection between the teeth and the bar to which they are attached; and another difficulty also arises from their shape being unfavorable to their action, as they become too short and straight and have a jumping jerking motion, which is not conducive to efficiency. The contrast of the motions is shown in the diagrams Figs. 3 and 4, the former illustrating the line described by the point of the tooth when vibrated in an arc of which the head of the rake is the center, while the latter, Fig. 4, shows the line described by the point of the rake in my improvement, where the tooth is balanced upon a point between its ends. To repeat, the advantage of length of tooth is, first, that its shape and elasticity enable the strain to be placed upon it and not induce an action which tends to tear it loose from its head, or to break it off at the point of attachment; secondly, it admits of being presented properly to rake the hay off the ground; and now my object is to unite with these advantages the motion which will make such a tooth readily retractible from the hay, and, in addition, by balancing, partial or complete, to make it more readily operated.

In my device, in raking the whole length of the tooth is used, and in discharging only the length from the fulcrum-bar rearwardly.

It will be understood from the foregoing that the gist of my invention is balancing the gang of rake-teeth on a bar, independent for the due performance of its functions of the draft device, by which I am enabled to make them the shape and length which is desirable, and at the same time make them readily retractible from the hay and moved with but small effort. The head of the rake is only connected to the fulcrum-bar, and upon this fulcrum-bar the weight of the rake is imposed.

There have been attempts at balancing the rake by means of a counterbalance frame or weight which assists the motion of the rake, but this makes additional weight and expense, and is inconvenient, as it must be a strictly additional burden for the machine and the animal, the material costs money, whatever it may be, and it must have room to traverse in as the teeth are raised.

I am aware that wooden arms with teeth attached have been lifted by pressure upon their forward ends, to which the draft-power is attached, the downward motion partially rotating the axle on which they are imposed, so that by the pressure of the foot the axle may be turned and the teeth lifted. In this case the axle is used as a fulcrum, there is no pretence of balancing, but the weight of the person forms a counterpoise for the weight of the rear end of the teeth. In performing this the rake is necessarily drawn toward the horse, or the horse toward it, as the rake-head is forcibly driven downward to raise the teeth.

Other remarks might be made to show the features which distinguish my invention from its predecessors, but to avoid prolixity I desist.

Having thus described my invention, the following is what I claim as new therein and desire to secure by Letters Patent:

Sustaining the weight of the gang of curved metallic teeth, which are united to a common rake-head arranged behind the axle, upon such a point of their length that they shall be balanced, or nearly so, upon a bar which is free to rotate with them, and which is independent of the draft devices, substantially as described.

The above specification of my improvement in horse hay-rakes signed this 16th day of March, 1865.

A. B. SPROUT.

Witnesses:

EDWARD H. KNIGHT,
CHARLES D. SMITH.